United States Patent
Nixon et al.

(10) Patent No.: US 7,036,523 B2
(45) Date of Patent: May 2, 2006

(54) SERVICEABLE CHECK VALVE

(76) Inventors: Kenneth Nixon, 17725 S. Alexander Rd., Alexander, AR (US) 72002; James Volk, 131 Hibiscus Dr., Maumelle, AR (US) 72113

( * ) Notice: Subject to any disclaimer, the term of this patent is extended or adjusted under 35 U.S.C. 154(b) by 205 days.

(21) Appl. No.: 10/176,885

(22) Filed: Jun. 21, 2002

(65) Prior Publication Data

US 2002/0195147 A1  Dec. 26, 2002

Related U.S. Application Data

(60) Provisional application No. 60/299,955, filed on Jun. 22, 2001.

(51) Int. Cl.
 *F16K 15/06* (2006.01)
(52) U.S. Cl. ............... 137/454.5; 137/541; 137/543.23
(58) Field of Classification Search ............ 137/454.5, 137/541, 542, 543.21, 543.23
See application file for complete search history.

(56) References Cited

U.S. PATENT DOCUMENTS

| | | | | |
|---|---|---|---|---|
| 1,615,811 A | * | 1/1927 | Pearce ..................... | 137/454.5 |
| 1,659,478 A | * | 2/1928 | Black ....................... | 137/454.5 |
| 2,034,790 A | | 3/1936 | Arutunoff | |
| 2,930,397 A | * | 3/1960 | Herman ................... | 137/454.5 |
| 3,001,546 A | * | 9/1961 | Salisbury ................. | 137/541 |
| 3,037,458 A | | 6/1962 | Olmstead et al. | |
| 3,111,961 A | * | 11/1963 | Dudgeon .................. | 137/454.5 |
| 3,518,021 A | | 6/1970 | Lake et al. | |
| 3,542,057 A | * | 11/1970 | Staiano .................... | 137/454.5 |
| 3,891,001 A | * | 6/1975 | Botnick .................... | 137/549 |
| 3,904,211 A | | 9/1975 | Dega | |
| 3,914,072 A | | 10/1975 | Rowley et al. | |
| 3,926,443 A | | 12/1975 | Fenerty et al. | |
| 4,037,985 A | | 7/1977 | Karassik et al. | |
| 4,063,846 A | | 12/1977 | Eagle | |
| 4,099,890 A | | 7/1978 | Murakami et al. | |
| 4,129,144 A | * | 12/1978 | Andersson et al. ......... | 137/541 |
| 4,152,096 A | | 5/1979 | Murakami et al. | |
| 4,172,690 A | | 10/1979 | Kuntz | |
| 4,215,714 A | * | 8/1980 | Laue ....................... | 137/454.5 |
| 4,245,952 A | | 1/1981 | Eberhardt | |
| 4,257,443 A | * | 3/1981 | Turney .................... | 137/454.2 |
| 4,281,839 A | | 8/1981 | Schoenmeyr | |
| 4,410,188 A | | 10/1983 | Copes | |
| 4,422,469 A | * | 12/1983 | LaGrange et al. ..... | 137/315.33 |
| 4,511,307 A | | 4/1985 | Drake | |
| 4,572,056 A | | 2/1986 | Funke | |
| 4,655,684 A | | 4/1987 | Haentjens | |

(Continued)

*Primary Examiner*—John Rivell
(74) *Attorney, Agent, or Firm*—Gardere Wynne Sewell, LLP (57) ABSTRACT

Within a check valve, a spring urges a poppet into the closed position. If the fluid flow through the valve attempts to reverse, the poppet will seal against the valve seat by a combination of spring resistance and fluid pressure, thereby preventing all or a significant portion of fluid flow back through the valve body. The poppet is retained in the valve body by a retainer or other suitable part or combination of parts that can be removed for service of the check valve assembly.

14 Claims, 5 Drawing Sheets

U.S. PATENT DOCUMENTS

| | | |
|---|---|---|
| 4,664,595 A | 5/1987 | Tsuji et al. |
| 4,746,269 A | 5/1988 | Raab |
| 4,768,923 A | 9/1988 | Baker |
| 4,824,123 A | 4/1989 | Chia et al. |
| 4,826,396 A | 5/1989 | Blount |
| 4,871,297 A | 10/1989 | Boes et al. |
| 4,872,808 A | 10/1989 | Wilson |
| 4,884,945 A | 12/1989 | Boutin et al. |
| 4,909,705 A | 3/1990 | Katsura et al. |
| 4,909,707 A | 3/1990 | Wauligman et al. |
| 4,913,619 A | 4/1990 | Haentjens et al. |
| 4,971,093 A * | 11/1990 | Andersson .................. 137/541 |
| 5,133,639 A | 7/1992 | Gay et al. |
| 6,129,338 A * | 10/2000 | Golan ........................ 251/310 |

* cited by examiner

SERVICEABLE CHECK VALVE

This application claims the benefit of Provisional application Ser. No. 60/299,955, filed Jun. 22, 2001.

TECHNICAL FIELD OF THE INVENTION

The present invention relates generally to fluid valves, and particularly to one-way check valves used in combination with water pumps.

BACKGROUND OF THE INVENTION

Check valves are designed to control the direction of flow of a fluid through a conduit. A typical check valve permits flow in one direction, but prohibits flow in an opposite direction. Typical check valve assemblies include a spring-loaded poppet fixed within a valve body. The poppet seals the flow of fluid against a valve seat. One significant disadvantage of many check valves is that they sometimes fail in service. Generally, if one component in the check valve assembly fails, the entire assembly must be replaced. This imposes a significant maintenance cost on such valves.

SUMMARY OF THE INVENTION

In accordance with the present invention, the check valve consists of a valve body with a poppet and a removable retainer. The check valve allows fluid to pass in one direction, but prohibits flow from passing in an opposite direction. The valve includes a poppet that will seal against a valve seat to impede the flow of fluid. The check valve as provided herein may be serviced or replaced because the valve comprises a retainer that is removable. In certain embodiments, lands are disposed on the retainer ring in order to aid in removal or installation of the retainer. The check valve may, in certain embodiments, be serviced with the use of common hand tools such as pliers or a screwdriver. The removable retainer allows damaged and/or worn components such as poppets or other valve components to be serviced or replaced, thereby making the check valve serviceable. The invention is described in detail below with reference to the accompanying drawings.

In one embodiment, the present invention comprises a serviceable check valve having a valve body having an upper portion having an outlet, a lower portion having an inlet, and a central axis with a central passage connecting the inlet to the outlet. The valve further includes a check valve assembly having a sealing disk, a valve seat shaped and sized to seal against the sealing disk, a guide comprised of an upper portion and lower portion connected to the sealing disk, a spring connected to the guide in such manner as to move the sealing disk to contact the valve seat, and a retainer disposed to mate with the valve body and retain the check valve assembly within the valve body.

In a second embodiment, the present invention comprises a serviceable check valve having a valve body having an upper portion having an outlet, a lower portion having an inlet, and a central axis with a central passage connecting the inlet to the outlet; and a check valve assembly having a sealing disk, a valve seat shaped and sized to seal against the sealing disk, a guide comprised of an upper portion and lower portion connected to the sealing disk, a spring connected to the guide in such manner as to move the sealing disk to contact the valve seat, a retainer disposed to mate with the valve body and retain the check valve assembly within the valve body, a poppet, a retainer disposed about the poppet and secured to the valve body by a non-permanent connection having a feature that enables ease of removal for maintenance purposes, a dome on the poppet to prevent backflow, and a screw fastening the dome to the poppet and upper portion of the guide.

In a third embodiment, the present invention comprises a serviceable check valve submersible pump apparatus having a submersible pump having an outlet and a valve body. The valve has an upper portion having an outlet, a lower portion having an inlet, a central axis with a central passage connecting the inlet to the outlet and disposed on the outlet of the submersible pump, and a check valve assembly. The check valve assembly includes a sealing disk, a valve seat shaped and sized to seal against the sealing disk, a guide comprising an upper portion and lower portion connected to the sealing disk, a spring connected to the guide in such manner as to move the sealing disk to contact the valve seat, and a retainer disposed to mate with the valve body and retain the check valve assembly within the valve body.

BRIEF DESCRIPTION OF THE DRAWINGS

For more complete understanding of the features and advantages of the present invention, reference is now made to the detailed description of the invention along with the accompanying Figures.

DETAILED DESCRIPTION OF THE INVENTION

Although the making and using of various embodiments of the present invention are discussed in detail below, it should be appreciated that the present invention provides many applicable inventive concepts that can be embodied in a wide variety of specific contexts. The specific embodiments discussed herein are merely illustrative of specific ways to make and use the invention, and do not delimit the scope of the invention.

Figure 1A:
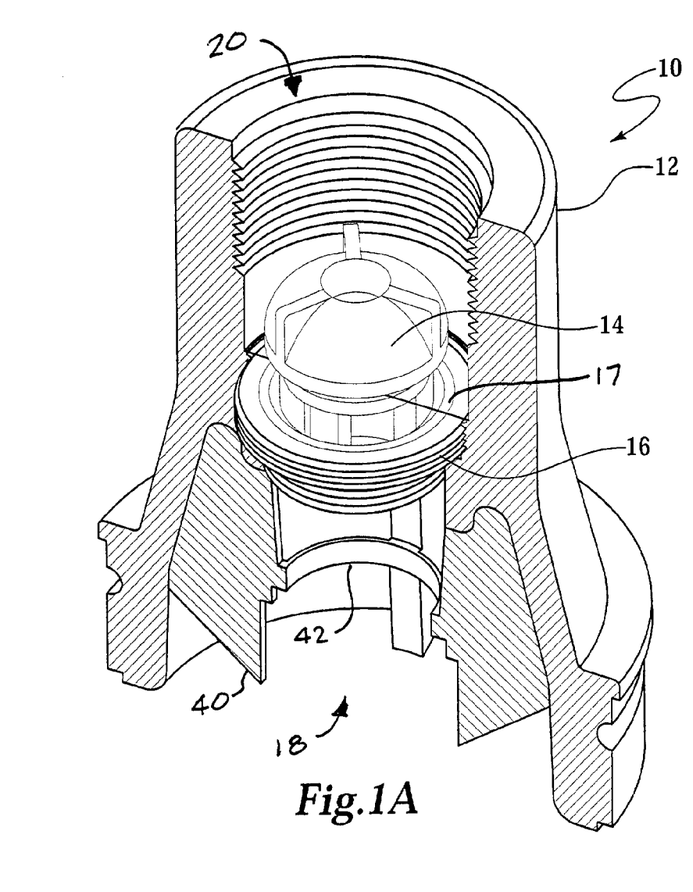
FIG. 1A depicts a three-dimensional sectional view of one embodiment of the present invention.
Figure 1B:
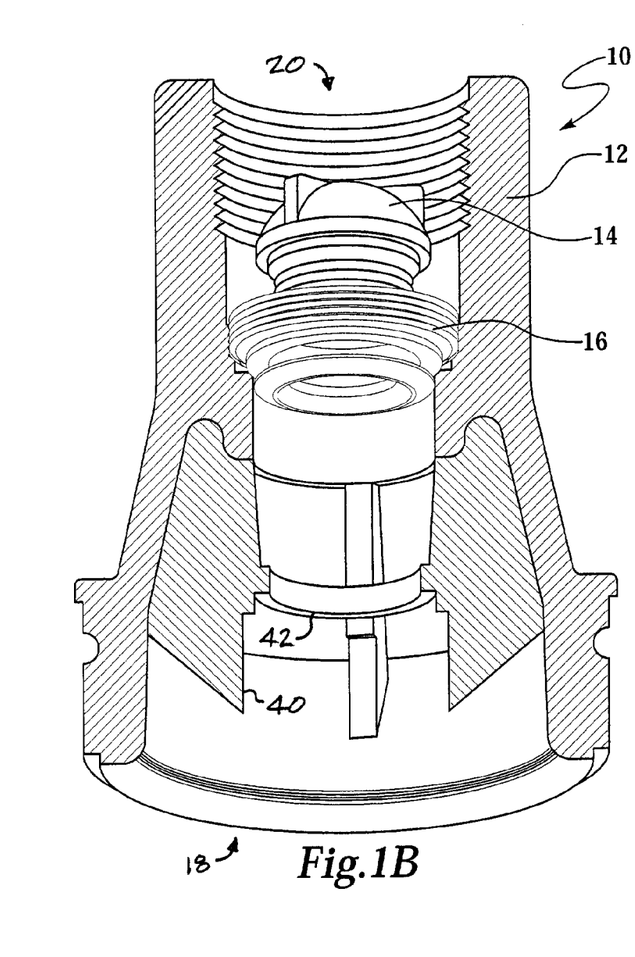
FIG. 1B depicts a three-dimensional sectional view of one embodiment of the present invention.
Figure 2:
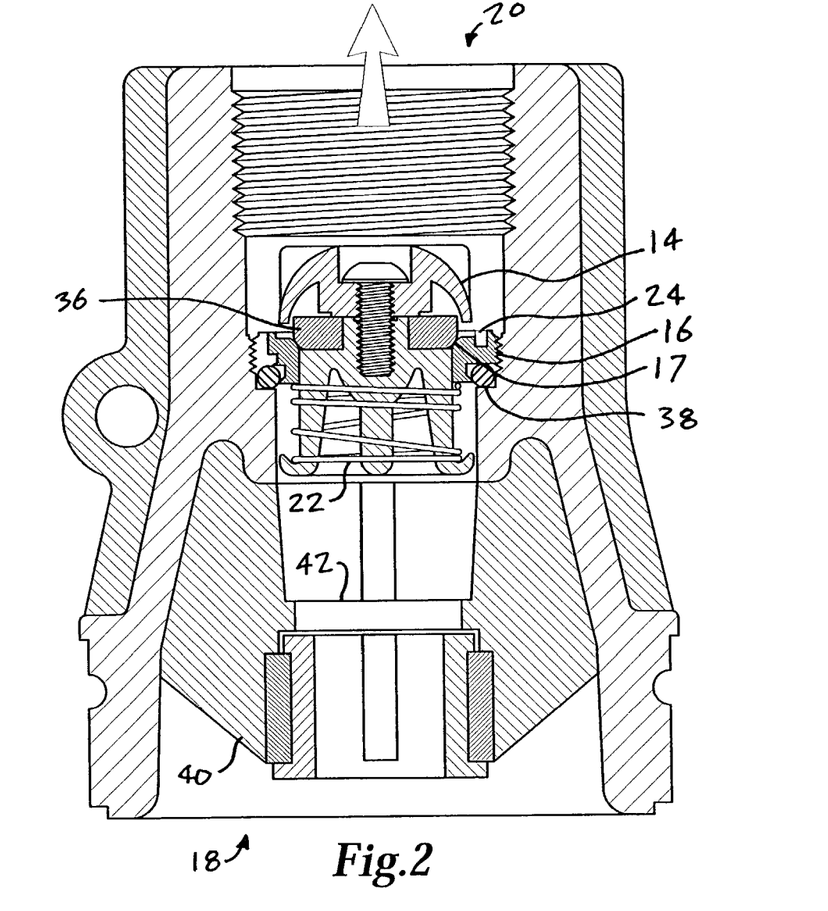
FIG. 2 depicts a side sectional view of one embodiment of the present invention.

Turning now to FIGS. 1 and 2, a serviceable check valve 10 according to one embodiment of the present invention includes a valve body 12, a poppet 14, and a retainer 16. The valve body 12 may be made from a variety of materials according to specific service requirements. For example, the valve body 12 may be fabricated from PVC or stainless steel if particular service requirements specify corrosion resistance. Alternatively, the valve body 12 may be made from mold injected plastic such as polyethylene or polystyrene.

The valve body 12 may also be machined or cast from a variety of metallic materials such as aluminum or brass.

The valve body 12 includes an inlet 18 and an outlet 20 and may be connected inline with a fluid conduit. The fluid may be liquid, gaseous or a multiphase fluid. The valve body 12 generally conducts the flow of fluid from the inlet 18 to the outlet 20. When closed, the poppet 14 engages a valve seat 17, which may be machined or molded within the retainer 16 or the valve body 12. The valve seat 17 may be fastened to the valve body 12 using threads, adhesives or other fastening techniques. The valve seat 17 may be fabricated from a material that is different from the material of the valve body 12.

Figure 3:
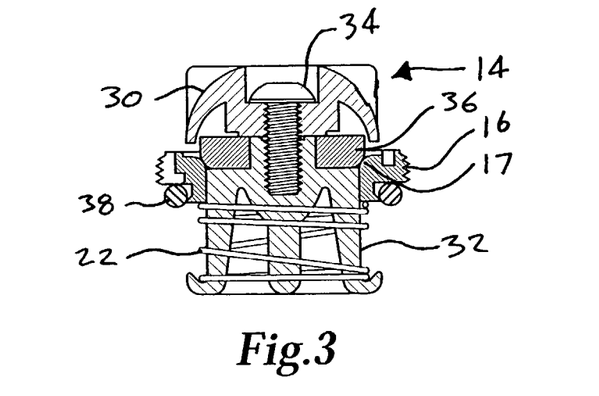
FIG. 3 depicts a side section detail view of a check valve assembly in accordance with one embodiment of the present invention.
Figure 4:
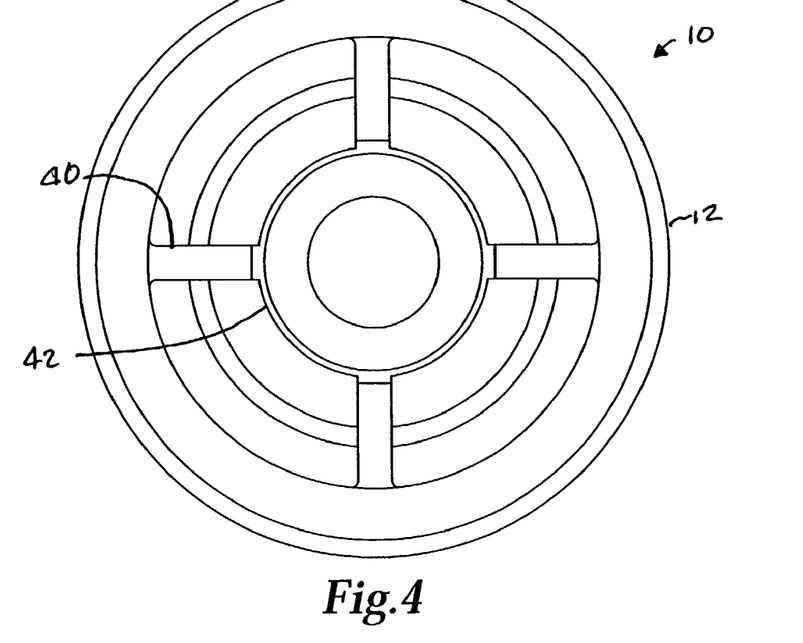
FIG. 4 depicts a bottom view of a serviceable check valve in accordance with one embodiment of the present invention.

Referring now to FIGS. 2–4, the check valve assembly 11, which includes the poppet 14 and the retainer 16, may be a one-piece unit or an assembly of parts. In one embodiment, for example, the poppet 14 includes a dome 30 that is attached to a guide 32 by a screw 34. The dome 30 may also be attached to the guide 32 by a threaded connection. The dome 30 and guide 32 may be an integral one-piece part.

In the embodiment shown in FIGS. 1–4, a sealing disc 36 is sandwiched between the dome 30 and the guide 32 to seal the poppet 14 against the valve seat 17. If the sealing disc 36 becomes worn or damaged, the sealing disc 36 may be replaced by removing the dome 30 from the guide 32. The sealing disc 36 generally seals against the valve seat 17, which may inhibit or prevent fluid flow from the outlet 20 to the inlet 18. O-rings, precisely machined surfaces, or other sealing techniques, which will be apparent to those having ordinary skill in valve design, may also be used to seal the poppet 14 against the valve seat 17.

A spring 22 urges the poppet 14 into the closed position and provides some resistance against fluid flow. If the fluid flow through the valve attempts to reverse, the poppet 14 will seal against the valve seat 17 by a combination of spring resistance and fluid pressure, thereby preventing all or a significant portion of fluid flow back through the valve body 12. The material used to manufacture the poppet 14 may be used to aid the seal. The poppet 14 may be made from a material similar to the valve body 12 or the poppet 14 may be made from dissimilar materials.

The poppet 14 is retained in the valve body 12 by the retainer 16 or other suitable part or combination of parts that can be removed for service of the check valve assembly 11. The retainer 16 may have an outside diameter that is larger or equal to the diameter of the poppet 14. The inside diameter of the retainer 16 may be smaller than the diameter of the poppet 14. The fluid may flow through retainer 16 while fluid is flowing through the valve body 12. The retainer 16 may prevent the poppet 14 from being displaced from the valve body 12 by fluid pressure.

Also shown in FIGS. 1–4 are vanes 40 and stabilizing ring 42. Together, these features can be used in conjunction with a fluid pump, described below, to retain a bearing for support and stabilization of the main shaft of the fluid pump. In designs not developed for use with a particular pump design, vanes 40 and stabilizing ring 42 may be omitted without departing from the spirit and scope of the present invention.

In the embodiment shown in FIGS. 1–3, the retainer 16 is retained in the valve body 12 by a threaded connection. Alternatively, the retainer 16 may engage the valve body 12 with one or more lugs. If lugs are used, the retainer 16 may be removably secured to the valve body 12 using a bayonet lug-type connection. If a threaded connection is used, the valve body 12 and retainer 16 may be left-hand threaded to prevent loosening of the retaining ring by fluid action. If the serviceable check valve 10 is located near a pump, for example, the resulting fluid flow may have a tendency to unscrew a right-hand threaded retainer 16. An O-ring 38 may be used to seal the retainer 16 against the valve body 12 and may also provide a frictional interface to prevent inadvertent loosening of the retainer 16. Other systems that allow the retainer 16 to be easily removed from the valve body 12 will be apparent to those having ordinary skill in fastener design.

The check valve assembly 11 may be easily serviced or replaced because the retainer 16 is easily removable. Although specialized tools may be used to install the retainer 16 into the valve body 12, personnel may service the retainer 16 in the field using common tools such as needle-nosed pliers or a screwdriver, for example. One or more lands 24 may be spaced around the retainer 16 to aid in removal or installation of the retainer 16.

A tool may be used to engage the lands 24 and remove the retainer 16, which will release the poppet 14 from the valve body 12. After the poppet 14 is removed, O-rings or other seals may be replaced, the valve seat 17 may be resurfaced or new components may be installed, for example. Also, springs 22 having different spring rates may be installed to manipulate the action of the poppet 14 according to different applications. For example, a spring 22 having a high rate may be used for high-pressure applications whereas a spring 22 having a low rate may be used for lower pressure applications. Other types of springs may be employed in place of the compression coil type spring 22 shown in FIGS. 1–4, including but not limited to extension coil springs, elastomer tubes, or Belleville springs.

A poppet 14 or other valve component that has been damaged by foreign objects flowing in the fluid may also be easily replaced because of the removable retainer 16. A user may easily access to the damaged or worn components of the serviceable check valve 10 by unscrewing or detaching the retainer 16 from the valve body 12. The worn or damaged components may be serviced or replaced according to the damage or desired application.

Figure 5A:
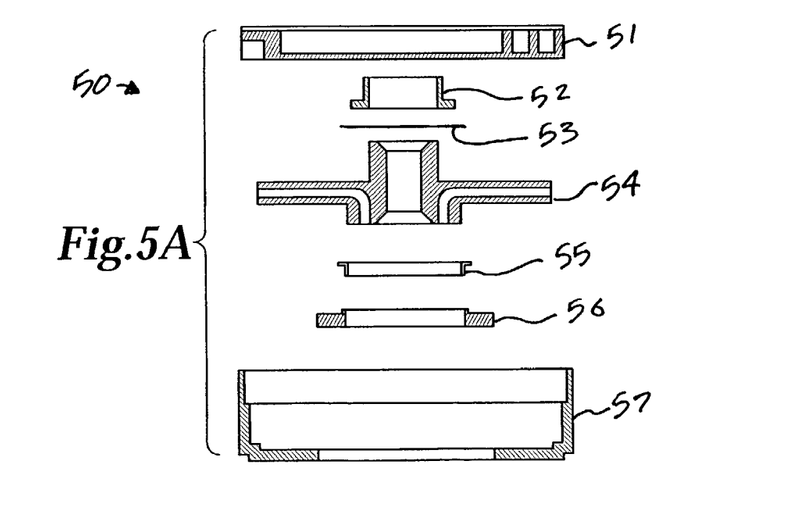
FIG. 5A depicts a pump stage assembly in accordance with certain embodiments of the present invention.
Figure 5B:
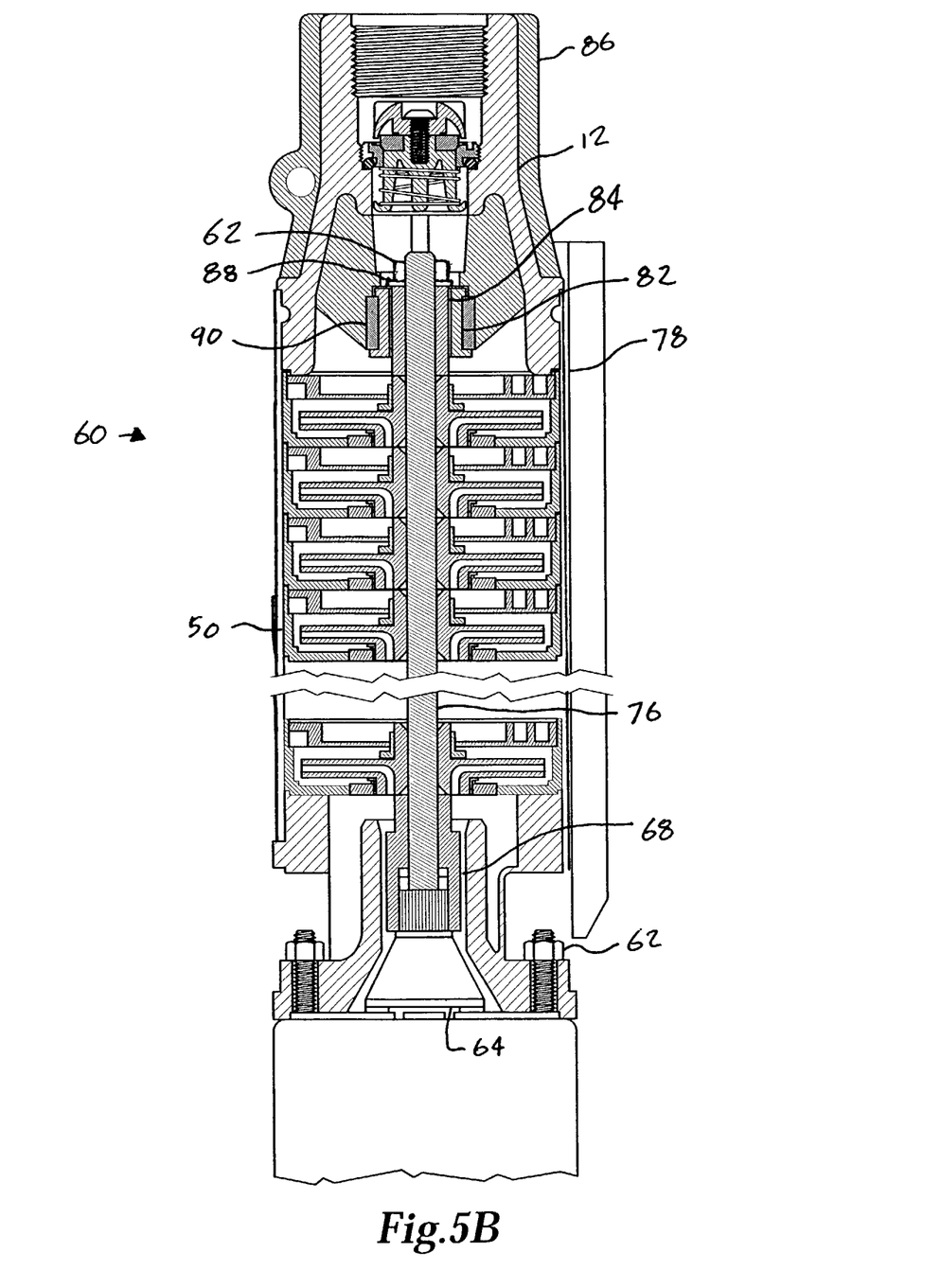
FIG. 5B depicts a side cutaway view of a pump and check valve assembly in accordance with one embodiment of the present invention.
Figure 5C:
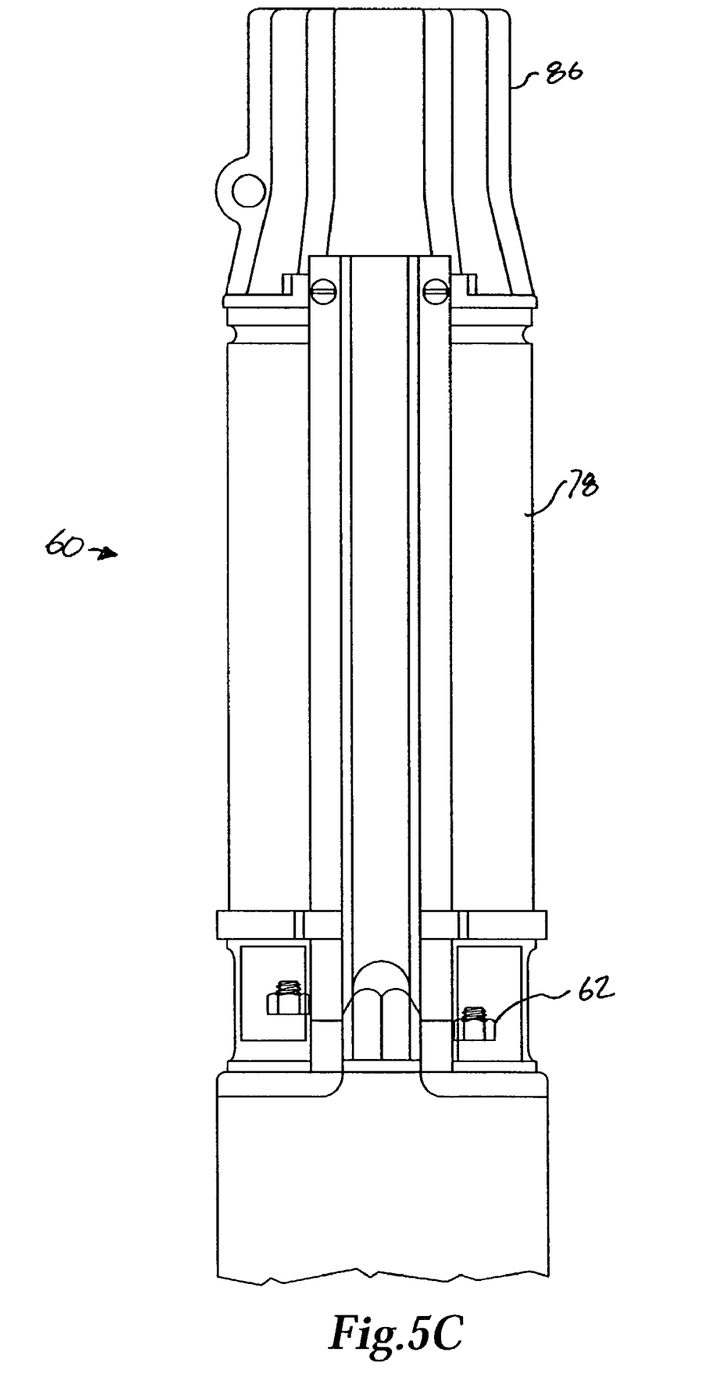
FIG. 5C depicts a side elevation view of a pump and check valve assembly in accordance with one embodiment of the present invention.

Referring now to FIGS. 5A–5C, a serviceable check valve 10 according to one embodiment of the invention may be attached directly to a pump housing of a submersible pump. The valve body 12 may be attached to a discharge orifice of the pump by a variety of methods such as crimping, welding, clamping or a threaded connection, for example. The valve body 12 may also be fabricated as an integral part of the pump housing. An integral valve body 12 may be molded or machined into the discharge orifice of the pump housing. An integral valve body 12 reduces the likelihood that the connection between the valve body 12 and the pump housing will fail. An integral valve body 12 may also reduce total production costs by reducing the total number of pieces in a pump system.

As seen in FIGS. 5B and 5C, pump and valve assembly 60 includes a main shaft 76 driven through coupling 68 by a submersible motor 64, all disposed within a pump shell 78. The main shaft 76 drives one or more pump stage assemblies 50 disposed thereon to move fluid through the pump. The end of main shaft 76 distal to the submersible motor 64 is supported by a hub sleeve 84 disposed within a bearing 82, which is disposed within a bearing holder 90 within the body of the check valve 12. The hub sleeve is fastened to main shaft 76 by nut 62 and washer 88. A discharge housing 86 is disposed around the check valve 12.

An exploded view of a stage assembly is shown in FIG. 5A. Stage assembly 50 includes a cup 57, which holds an eye seal 56 and wear ring 55. Impeller 54 is disposed within cup 57 and around main shaft 76 of pump assembly 60. Stage assembly 50 further includes a thrust washer 53, hub seal 52, and diffuser 51.

Because the serviceable check valve 10 may be serviced using common tools, maintenance and repair costs of the pump system are reduced. Maintenance personnel may replace worn or damaged parts of the serviceable check valve 10 rather than replacing an entire check valve assembly 10. The ability to use common tools to service the serviceable check valve 10 further enhances efficiency because maintenance personnel are not required to obtain specialized tools. For example, maintenance personnel working on an unrelated system problem may also make unplanned service to the serviceable check valve 10 if they determine that the serviceable check valve 10 is worn or damaged.

Although this invention has been described in reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that this description encompass any such modifications or embodiments.

What is claimed is:

1. A check valve in combination with a submersible pump for discharging fluid, said check valve comprising:
   a valve body including a valve inlet for receiving fluid discharged from said pump, said valve body including a valve outlet for discharging fluid flowing from said valve inlet;
   a valve poppet closure member including a guide member;
   a retainer member engaged with and supporting said guide member of said poppet and allowing limited movement of said guide member between valve open and closed positions, said retainer member including means thereon cooperable with means on said valve body to provide for inserting a valve assembly comprising said poppet and said retainer member through said valve outlet for retaining said valve assembly in said valve body to prevent flow of fluid from said valve outlet to said valve inlet, said retainer member being operable to be engaged with and rotated relative to said valve body to releasably retain said valve assembly in said valve body; and
   said retainer member includes a valve seat thereon engageable with means on said poppet for preventing flow of fluid from said valve outlet to said valve inlet.

2. The combination set forth in claim 1 wherein:
   said means on said retainer member and on said valve body comprise cooperating threads for releasably retaining said valve assembly in and engaged with said valve body to prevent flow of fluid from said valve outlet to said valve inlet.

3. The combination set forth in claim 2 wherein:
   said cooperating threads are left hand threads.

4. The combination set forth in claim 2 wherein:
   said retainer member includes lands formed thereon for engagement by a tool for rotating said valve assembly for removal from said valve body through said valve outlet.

5. The combination set forth in claim 1 including:
   a resilient seal member interposed said retainer member and said valve body when said valve assembly is engaged with said valve body.

6. The combination set forth in claim 1 including:
   a spring supported on said guide member and engageable with said retainer member for urging said poppet to a valve closed position.

7. The combination set forth in claim 1 including:
   a sealing disc supported on said guide member and engageable with said retainer member at said portion forming said valve seat in a valve closed position of said poppet.

8. The combination set forth in claim 1 wherein:
   said poppet includes a removable dome part connected to said guide member by a threaded fastener, said dome part retaining a removable sealing disc on said guide member, said sealing disc being engageable with said valve seat for preventing fluid flow from said valve outlet to said valve inlet.

9. A check valve in combination with a submersible pump for discharging fluid, said check valve comprising:
   a valve body including a valve inlet for receiving fluid discharged from said pump, said valve body including a valve outlet for discharging fluid flowing from said valve inlet;
   a valve poppet closure member including a guide member;
   a retainer member engaged with and supporting said guide member and allowing limited movement of said guide member between valve open and closed positions, said retainer member and said valve body include cooperating threads for releasably securing a valve assembly comprising said poppet and said retainer member in and engaged with said valve body to prevent flow of fluid from said valve outlet to said valve inlet and whereby said valve assembly may be inserted in and removed from said valve body through said valve outlet;
   said retainer member includes a valve seat thereon engageable with a member on said poppet for preventing flow of fluid from said valve outlet to said valve inlet; and
   a spring supported on said guide member and engageable with said retainer member for urging said poppet to a valve closed position.

10. The combination set forth in claim 9 wherein:
    said cooperating threads are left hand threads.

11. The combination set forth in claim 10 wherein:
    said retainer member includes lands formed thereon for engagement by a tool for rotating said valve assembly for removal from said valve body through said valve outlet.

12. The combination set forth in claim 9 including:
    a resilient seal member interposed said retainer member and said valve body when said valve assembly is engaged with said valve body.

13. The combination set forth in claim 9 including:
    said member on said poppet comprises a sealing disc supported on said guide member and engageable with said retainer member at said valve seat in a valve closed position of said poppet.

14. A check valve in combination with a submersible pump for discharging fluid, said check valve comprising:
    a valve body including a valve inlet for receiving fluid discharged from said pump, said valve body including a valve outlet for discharging fluid flowing from said valve inlet;
    a valve poppet closure member including a guide member;

a retainer member engaged with and supporting said guide member of said poppet and allowing limited movement of said guide member with respect to said retainer member between valve open and closed positions, said retainer member and said valve body include cooperating threads for releasably securing a valve assembly comprising said poppet and said retainer member in and engaged with said valve body to prevent flow of fluid from said valve outlet to said valve inlet and whereby said valve assembly may be inserted in and removed from said valve body through said valve outlet;

a resilient seal member interposed said retainer member and said valve body;

said retainer member includes a valve seat thereon engageable with a sealing disc releasably retained on said poppet for preventing flow of fluid from said valve outlet to said valve inlet; and a spring supported on said guide member and engageable with said retainer member for urging said poppet to a valve closed position.

* * * * *